M. L. & C. M. CLINTON.
GRATER AND SLICER.
No. 183,132.   Patented Oct. 10, 1876.
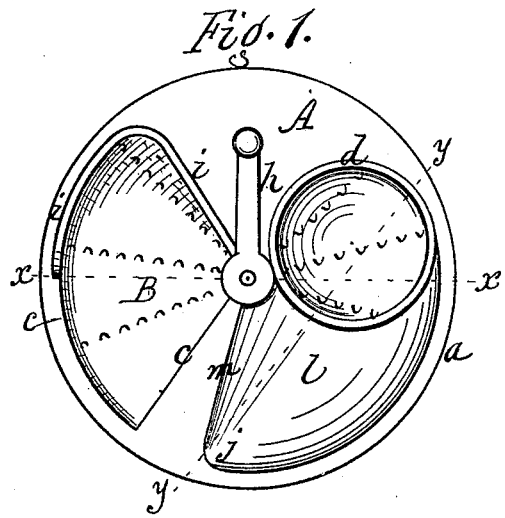
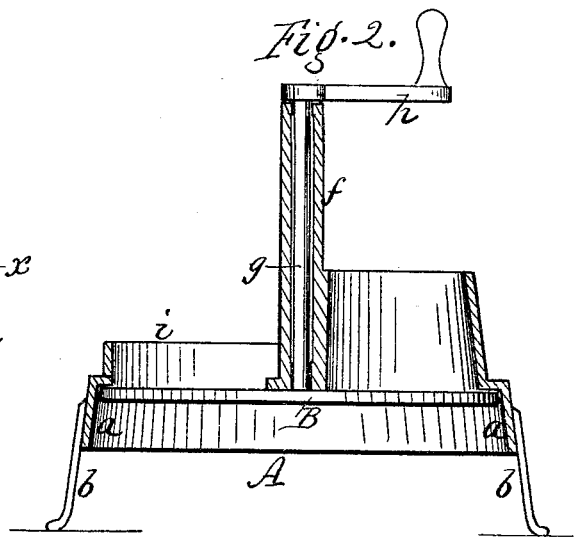
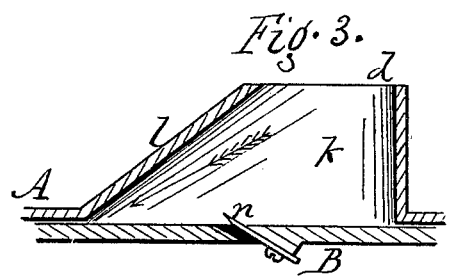
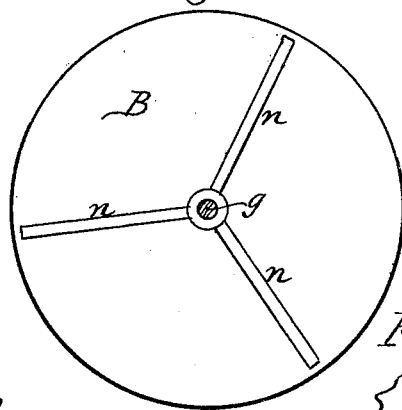
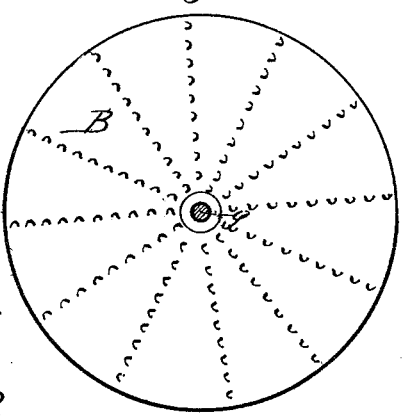
Witnesses.
E. B. Scott
Jno. O. Spalin
Inventors.
Miles L. Clinton,
Chas M. Clinton,
per R. F. Osgood,
Atty.

UNITED STATES PATENT OFFICE.

MILES L. CLINTON AND CHARLES M. CLINTON, OF ITHACA, NEW YORK.

IMPROVEMENT IN GRATERS AND SLICERS.

Specification forming part of Letters Patent No. 183,132, dated October 10, 1876; application filed May 16, 1876.

*To all whom it may concern:*

Be it known that we, MILES L. CLINTON and CHARLES M. CLINTON, both of Ithaca, in the county of Tompkins and State of New York, have invented a certain new and useful Improvement in Graters and Slicers; and we do hereby declare that the following is a full, clear, and exact description of the construction and operation of the same, reference being had to the accompanying drawings, in which—

Figure 1 is a plan. Fig. 2 is a section in line $x\,x$ of Fig. 1. Fig. 3 is a section in line $y\,y$ of Fig. 1. Figs. 4 and 5 are plans of the cutter and grater disks. Fig. 6 is a detail view.

This improvement relates to a machine for grating and slicing vegetables for table use. The invention consists in the construction and arrangement of the case and of the grating-disk, as hereinafter more fully described.

A represents the case, which is preferably made of cast-iron. It is constructed with a circular, vertical, dish-shaped rim, $a$, supported by legs $b\,b$, of sufficient height to allow a pan to be slid under the rim. It has a flat top, in which are two openings, $c\,d$, for the insertion of the vegetables to be grated or sliced. In the center is a vertical standard, $f$, in which rests the spindle $g$ of the grater or cutting disk B. This disk is simply a flat wheel, which is inserted upward from the bottom, within the rim $a$, and rests close up against the top of the case. On the end of the spindle $g$, which projects up through the hollow standard $f$, is attached a crank, $h$, by which motion is imparted to the disk. The vegetables placed in the opening $c$ or $d$ are grated or sliced, according as the grating or cutting disk is used. The opening $c$ is of quadrant form, and of considerable extent, and is used more particularly for grating. It is bounded on the farthest side by a raised rim, $i$, which forms a stop or rest to the article being acted upon. The vegetable is simply held upright against this shoulder, while the grating or cutting disk is rotated beneath it. The opening $d$ is round or oval, and is located at the top of a raised hopper-shaped receptacle, $k$, in which the vegetables are placed to be sliced. This hopper is provided with a wedge-shaped trunk, $l$, which extends forward in spiral form in the direction of rotation, and gradually contracts to the surface of the cutting-disk as it nears the point. The end of the trunk is pointed as shown at $j$, so as to concentrate the article to that point as it is cut away. The inner boundary of the trunk is a radial or nearly radial line, as shown at $m$, so that the cutters of the cutting-disk first intersect it at the outer end or point $j$, and then sweep in a shearing cut toward the center. This receptacle is intended only to receive small vegetables, such as potatoes or apples, which are approximately round. These are thrown promiscuously into the opening, and are fed forward by the cutting-disk. The spiral wedge form of the trunk produces constant pressure upon the vegetable as it is fed forward in the trunk, thereby holding it firmly down to the action of the cutters. This it does till the extreme farther point $j$ is reached, so that the vegetable will be all cut away. The spiral and pointed form of the trunk concentrates the piece as it is cut away, so that none will be left. The device cuts thin and uniform slices, and is more effective than ordinary reciprocating slicers, in which the vegetable is held by hand, and a piece is left at the end which cannot be cut. Another advantage of the machine is the circular rim, open on its under side, to enable the disk to be inserted up within the rim against the cutting-bed, and the hollow standard $f$, for receiving the spindle $g$. The disk and spindle form one device, and by means of the circular rim above described one disk may be substituted for another with great facility.

The cutting-disk, Fig. 4, is armed with radial cutters $n\,n$ of any desired kind. The grating-disk, Fig. 5, is formed in a peculiar manner. The holes are punched from the under side in the direction of motion of the disk when in use. This leaves the burrs or teeth $p\,p$, Fig. 6, projecting forward in the line of motion and overhanging the holes $q\,q$. The burr is also made somewhat pointed, as shown. These pointed burrs grate or rasp into the substance being cut, and, standing forward in an inclined direction, they force the material through the holes into the pan beneath. By this means the grating-disk is self-clearing, the grated material passing through and leaving the upper surface of the disk entirely clear at all times. Ordinary graters are punched at right angles to the grating-surface, which leaves the burr of circular form, standing upright, and as a consequence the device is not self-clearing, but the material gathers on top.

The apparatus above described is usually made from eight inches to a foot in diameter, can be made very cheaply, and is of convenient form for household use.

What we claim as new is—

The casing A, constructed with the hollow dish-shaped rim $a$, hollow standard $f$, spiral wedge-shaped receptacle $k$, and opening $c$, with the raised rim $i$, as shown and described, and for the purpose specified.

In witness whereof we have hereunto signed our names in the presence of two subscribing witnesses.

MILES L. CLINTON.
CHARLES M. CLINTON.

Witnesses:
  DOCTOR TARBELL,
  O. P. HYDE.